United States Patent
Denny et al.

(10) Patent No.: US 7,551,733 B2
(45) Date of Patent: Jun. 23, 2009

(54) METHODS AND DEVICES FOR ESTABLISHING AN AREA PARTY LINE SERVICE FOR TELEPHONE CALLS

(75) Inventors: Michael S. Denny, Sharpsburg, GA (US); Sammie W. Hill, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1035 days.

(21) Appl. No.: 10/603,402

(22) Filed: Jun. 24, 2003

(65) Prior Publication Data

US 2004/0264669 A1    Dec. 30, 2004

(51) Int. Cl.
    *H04M 3/42*    (2006.01)
    *H04B 7/00*    (2006.01)
(52) U.S. Cl. .......................... 379/202.01; 379/201.01; 379/204.01; 455/416; 455/519
(58) Field of Classification Search ............ 379/202.01, 379/121.01, 204.01, 88.04, 203.01, 212.01, 379/221.12, 207.12, 201.01; 370/260, 356; 455/416, 414.1, 519, 404.2; 709/206, 204, 709/219; 345/758
    See application file for complete search history.

(56) References Cited

U.S. PATENT DOCUMENTS

| | | | | |
|---|---|---|---|---|
| 5,721,763 A | * | 2/1998 | Joseph et al. | 379/88.04 |
| 6,504,920 B1 | * | 1/2003 | Okon et al. | 379/121.01 |
| 6,608,820 B1 | * | 8/2003 | Bradshaw, Jr. | 370/260 |
| 6,629,136 B1 | * | 9/2003 | Naidoo | 709/219 |
| 6,788,949 B1 | * | 9/2004 | Bansal | 455/519 |
| 6,931,114 B1 | * | 8/2005 | Martin | 379/203.01 |
| 6,968,179 B1 | * | 11/2005 | DeVries | 455/414.1 |
| 7,200,214 B2 | * | 4/2007 | Knappe et al. | 379/204.01 |
| 2001/0048449 A1 | * | 12/2001 | Baker | 345/758 |
| 2002/0095465 A1 | * | 7/2002 | Banks et al. | 709/206 |
| 2003/0073430 A1 | * | 4/2003 | Robertson et al. | 455/416 |
| 2003/0225833 A1 | * | 12/2003 | Pilat et al. | 709/204 |
| 2004/0062236 A1 | * | 4/2004 | Lee et al. | 370/356 |

\* cited by examiner

*Primary Examiner*—Thjuan K Addy
(74) *Attorney, Agent, or Firm*—Parks Knowlton LLC; Paul Knowlton, Esq.; Jonathan A. Paulis, Agent (57) ABSTRACT

Methods and devices establish an area party line for telephone calls to provide a geographically based chat forum via a telephone. One method receives telephone calls at a local call station where the telephone calls may be landline calls from callers serviced by the local call station, wireless phone calls from users who are currently located in proximity to the local call station, and/or long distance calls from callers who have dialed into the local call station using an area code and exchange. Callers provide an indication of an area party line, such as a star code, and the local call station bridges the calls together. Another method receives telephone calls at a central call station, where the telephone calls are directed to the central call bridging station from a local call station, and the central call bridging station bridges the callers together depending upon the local call station that the calls are transferred from. The callers may be local callers, long distance callers, or wireless callers to the local call station.

3 Claims, 4 Drawing Sheets

METHODS AND DEVICES FOR ESTABLISHING AN AREA PARTY LINE SERVICE FOR TELEPHONE CALLS

TECHNICAL FIELD

The present invention is related to area party lines. More specifically, the present invention is related to providing an area party line service option for telephone callers.

BACKGROUND

In the early years of telecommunications service, the various sites receiving telecommunications service for a given area were connected on a party line. Each individual site was not separately addressable, so individuals were required to share the line. Each individual site had a unique ring so that it could be determined whether an incoming call on the party line was for a particular site and the call could be answered by the correct party.

Advances in telecommunications service lead to individually addressable lines for each site within a given area. These private lines allow users to carry on private conversations at any time, regardless of whether others in the same area are also using their telephones. These private lines are established by a signal switching point ("SSP") located within a central office, which is a local call station that provides the direct connections to the various sites receiving telecommunications service. This SSP may form a node on an Advanced Intelligence Network ("AIN") that provides advanced services for telecommunications subscribers including individually addressable lines, call waiting, caller ID, and other features. Thus, the party line has been completely engineered out of the advanced telecommunications system.

While telecommunications users often prefer the ability to have a private telephone conversation with another individual, there are instances where a telecommunications subscriber may prefer to enter a chat forum, such as chat forums on the Internet where several people at different locations can carry on a conversation without necessarily setting up a special time and place as would be necessary for a conference telephone call. However, the telecommunications users may prefer to enter a chat forum simply by use of the telephone and may also prefer that the chat forum have some geographical relevance. However, such chat forums are not provided for on a current telecommunications network since the network provides for private lines instead of party lines.

SUMMARY

Embodiments of the present invention address these issues and others by providing methods and devices that provide area party line service at the option of the telephone user. When a user opts to use the area party line function, the telephone call from the user is bridged into the area party line that bridges multiple telephone calls into one telephone chat forum.

One embodiment is a method of creating an area party line. The method involves receiving a first telephone call at a first local call station directly over a first telecommunication link. The first telephone call provides an area party line indication. A second telephone call is received at the first local call station directly over a second telecommunication link, and the second telephone call provides the area party line indication. In response to receiving the area party line indication of the first and second telephone calls, the first telephone call is bridged to the second telephone call at the first local call station to establish an area party line between the first telephone call and the second telephone call.

Another embodiment is a method of creating an area party line. The method involves receiving a first telephone call at a first local call station directly over a first telecommunication link. The first telephone call provides an area party line indication. A second telephone call is received at a second local call station over a second telecommunication link, and the second telephone call provides the area party line indication for the first local call station. The second telephone call is transferred from the second local call station to the first local call station based on the area party line indication of the second telephone call. The second telephone call transferred from the second local call station is received at the first local call station. The second telephone call is bridged with the first telephone call at the first local call station to establish the area party line between the first telephone call and the second telephone call.

Another embodiment is a method of creating an area party line. The method involves receiving a first telephone call at a first local call station directly over a first telecommunication link. The first telephone call provides an area party line indication. A second telephone call is received at the first local call station directly over a second telecommunication link, and the second telephone call provides the area party line indication. In response to receiving the area party line indication of the first telephone call, the first telephone call is transferred to a central call bridging station. In response to receiving the area party line indication of the second telephone call, the second telephone call is transferred to the central call bridging station. Based on receiving the first telephone call and the second telephone call from the first local call station, the first telephone call is bridged to the second telephone call at the central bridging station to establish an area party line between the first telephone call and the second telephone call.

Another embodiment is a method of creating an area party line. The method involves receiving a first telephone call at a first local call station directly over a first telecommunication link. The first telephone call provides an area party line indication. A second telephone call is received at a second local call station over a second telecommunication link, and the second telephone call provides the area party line indication for the first local call station. The first telephone call is transferred from the first local call station to a central call bridging station based on the area party line indication. The second telephone call is transferred from the second local call station to the first local call station and from the first local call station to the central call bridging station based on the area party line indication. The second telephone call is bridged with the first telephone call at the central call bridging station to establish the area party line between the first telephone call and the second telephone call based on the transfer of the first telephone call and the second telephone call from the first local call station.

Another embodiment is a telecommunications switching point. The telecommunications switching point comprises at least one termination point for receiving incoming telephone calls over telecommunications links. The at least one termination point is configured to detect an area party line indication of the incoming telephone calls. The telecommunications switching point also comprises a bridging point for bridging incoming telephone calls to establish an area party line. The at least one termination point is further configured to connect the incoming telephone calls to the bridging point upon detecting the area party line indication, and the bridging point is configured to bridge the incoming calls received from the at least one termination point.

Another embodiment is a telecommunications bridging station for establishing an area party line. The telecommunications bridging station includes at least one termination point for receiving incoming telephone calls over telecommunications links from a plurality of telecommunications switching points. The telecommunications bridging station also includes a bridging point for bridging incoming telephone calls that are transferred from a same telecommunication switching point of the plurality to establish an area party line for the telecommunications switching point.

DETAILED DESCRIPTION

Embodiments of the present invention provide area party line service for users of telephone service so that chat forums may occur through the randomly placed telephone calls into the area party line service. Accordingly, the telephone caller can make use of a party line when desired but can continue to benefit from private line telephone service when an area party line call is not desired.

Figure 1:
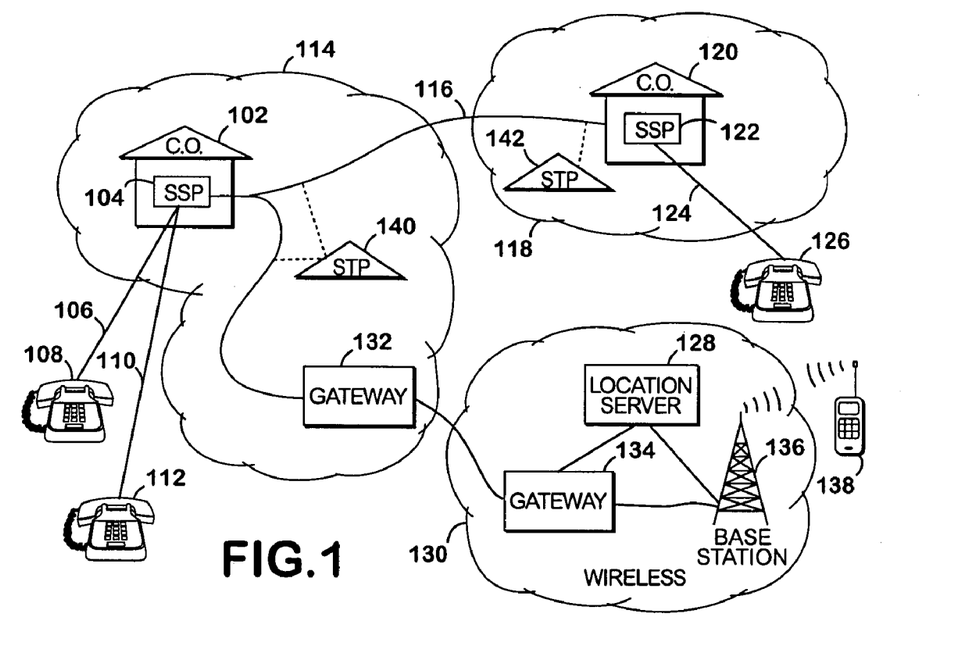
FIG. 1 shows an illustrative encompassing telecommunications network including individual public switched telephone networks, long distance networks, and wireless networks that serves as an operating environment for embodiments of the present invention.

FIG. 1 shows a telecommunications system that provides an operating environment for embodiments of the present invention. The telecommunications system includes a public switched telephone network ("PSTN") 114 that includes central offices such as central office 102. Central office 102 includes an SSP 104 that interconnects the PSTN 114 to the individual telephone lines 106 and 110 of local telephone service subscribers that are direct lines back to the SSP 104. Conventionally, the SSP 104 receives a telephone call and then directs the call through the PSTN 114 to an SSP interconnecting the line dialed by the party to establish a private call between the calling and called parties.

According to the embodiment of FIG. 1, the SSP 104 provides an area party line service. When a caller of telephone 108 places a call over line 106 directly to the SSP 104, the caller dials a special number for the area party line service. For example, the party dials a star code (*##) or a number such as #11. The SSP 104 detects the dialed number indicating the area party line service and then bridges the caller into the area party line with other callers. Because the SSP 104 provides service to a limited geographic area, the area party line provided by the SSP 104 is provided with an inherent geographical significance. As described below with reference to FIG. 5, the SSP 104 may provide various options to the caller entering the area party line service, such as providing a call-back option upon others entering the area party line when the caller is the only current participant or upon access to the area party line becoming available.

The area party line service may be established through the SSP 104 for various caller types. For example, a local telephone caller dialing into the service through phone 108 and landline 106 may be placed in an area party line where another local telephone caller dials into the service through phone 112 and landline 110. Both callers dial the party line number that is recognized by the SSP 104 and the callers are bridged together within the area party line. Several other local callers may also dial into the service and join the area party line service as well. The capacity of the area party line for a given SSP 104 is dictated by the amount of hardware that is devoted to the SSP 104, as discussed below with reference to FIG. 2.

In addition to the local callers joining the area party line service, additional caller types may also be included. For example, a caller may wish to join an area party line for a distant location such as to ask a general question about the area or to determine if someone known to be located in the area is participating in the area party line. Accordingly, the caller may place a call from telephone 126 over landline 124 which is interconnected to the SSP 122 of the local central office 120 for the caller. In one embodiment, the caller may simply dial into the local area party line service of the SSP 122 and be provided a menu which includes an option to connect to a distant area party line. In that situation, the caller selects the option and then provides the area code and exchange number for the distant area party line. As an alternative, the caller may place a conventional call by dialing an area code and exchange for the distant area party line and then dial a four-digit area party line identifier such as #111.

Once the caller has provided the area code and exchange to the menu based alternative or has completed the dialing of the conventional 10-digit number, the call is transferred based on the area code, exchange, and area party line indicator from the SSP 122 per instruction from a signal transfer point ("STP") 142 of the PSTN 118 that is local to the caller. The call is transferred through the PSTN 118 to a long distance network 116 interconnecting the PSTN 118 of the caller to the PSTN 114 of the area party line that the caller is seeking. The long distance network 116 is typically interconnected to the PSTN 118 and PSTN 114 via a gateway. The call is then routed through the PSTN 114 per instruction from the STP 140 to the SSP 104 of the local central office 102 corresponding to the area code and exchange entered by the caller. The SSP 104 recognizes the area party line indication, such as the #111, included with the incoming call and bridges the caller into an available port of the area party line bridge.

Another caller type that may join the area party line is a wireless mobile phone caller. For example, the wireless mobile phone caller may be passing through an unfamiliar area and may wish to enter into an area party line to ask local residents questions about the area to assist the caller. The caller places a call to an area party line service through a mobile phone 138 by dialing a special area party line number or star code such as #11 or *##. A base station 136 of a wireless network 130 receives the dialed information from the phone 138 and provides the dialed information to a location server 128. The location server 128 then performs a look-up of the appropriate PSTN exchange that services the locality where the base station 136, and hence caller using phone 138, is located. The wireless call from phone 138 is then directed with the exchange and area party line indicator through a gateway 134 linking the wireless network 130 to a gateway 132 of the PSTN 114.

The wireless call is directed from the gateway 132 through the PSTN 114 to the SSP 104 according to the exchange that has been determined by the location server 128 and that is included with the wireless call. The SSP 104 receives the wireless call and recognizes the area party line indicator. The SSP 104 then bridges the wireless call into the area party line.

The location server 128 may be configured to provide an option to the caller when the wireless call is handed off to a different base station during travel of the caller. The location server 128 detects the new base station and performs a new look up to find a new exchange that services the area where the new base station is located. If the caller opts to switch to the new area party line, then the location server 128 may disconnect the caller from the PSTN connection through gateway 134 and then re-establish a PSTN connection using the new exchange. The wireless call is then sent to the SSP for the new exchange where the call is bridged into the area party line for that location.

While FIG. 1 describes an embodiment where a landline SSP 104 provides the area party line service by recognizing the area party line indicator and bridging callers together as appropriate, it will be appreciated that the area party line service may be provided from the wireless network 130. For example, a the base station 136 may include the functionality of the landline SSP 104 such that wireless calls and others received at the base station 136 that provide an area party line indicator are bridged together to form an area party line. Accordingly, callers using mobile phone 138 may access an area party line through the base station 136 or other component of the wireless network that bridges the calls together without being directed over a PSTN 114.

Figure 2:
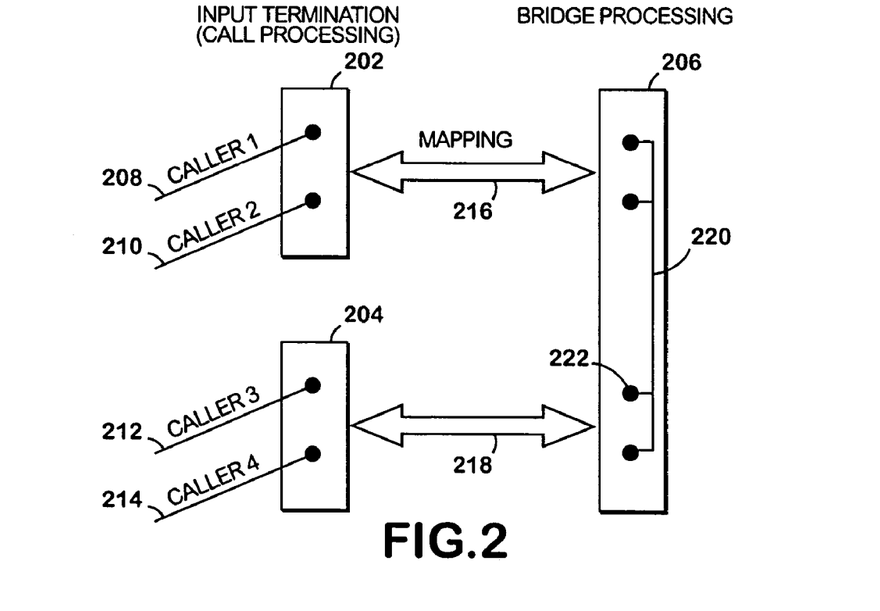
FIG. 2 shows a diagram of a signal switching point that terminates calls to a local call station and bridges the calls to provide the area party line.

FIG. 2 describes the components of the SSP 104 that provide the area party line service. The SSP 104 contains conventional multiple call termination points 202, 204 that accept multiple telephone lines 208, 210, 212, 214 of callers when incoming and outgoing calls may be placed. These conventional call termination points 202, 204 may provide call processing such as recognizing the number dialed on an incoming call and determining where the incoming call should be directed based on stored mapping information. The SSP 104 of this embodiment includes mapping 216, 218 that controls the routing of incoming calls of the termination points 202, 204 that have dialed the area party line indicator. These calls with the area party line indicator are mapped to bridge processing 206 that provide multiple ports 222 that are bridgeable together to form a party line 220.

The bridge processing 206 receives the call from the termination point 202, 204 and assigns the call to an available port 222 of the party line 220. However, if no port is available due to the bridge processing 206 reaching maximum caller capacity, then the caller may be provided a busy signal or may be provided an option to be called back when a port 222 becomes available. Likewise, when a caller is the only caller to have dialed into the area party line service, the bridge processing 206 may provide an option to dial in the caller upon a second participant dialing into the area party line service. Upon assigning the incoming calls to a port 222 to bridge the calls together on the party line 220, each call of the party line 220 can hear audio from another call so that a verbal chat forum is provided.

In addition to providing a party line bridge 220 between all available ports, the bridge processing 206 may reconfigure the bridging of the ports as necessary to provide private chat forums. For example, callers may dial a code or provide other indication when in an area party line to trigger a private forum. The bridge processing 206 may respond to the private forum trigger by reconfiguring the ports of those callers requesting the same private forum so that those ports are bridged separately from other ports that are bridged. Thus, the private forum is provided while the area party line continues as well. Upon the private forum participants deciding to exit the private forum such as through dialing an exit code, the port for the exiting participant is then bridged back into the main area party line bridge.

The bridge processing 206 may be implemented as an area party line interface card incorporated into the SSP 104 of the central office. For example, the area party line interface card may be provided with standard interface specifications for #5ESS or Northern Telecom DMS-100 switches. Each interface card may support a pre-defined number of participants for an area party line, but the number of participants may be increased through cascading to additional interface cards.

The area party line interface card may operate in an unattended mode but provide alarms, diagnostics, system configuration, operational control and firmware/software changes capability. For example, the interface card may provide real-time conference management and monitoring to allow the viewing of conference status and the number of participants as well as the time the participants joined the area party line. The interface card may provide for manual termination of active party lines, muting of individual participants, and the uploading of messages that may be played back for participants entering the area party line. The interface card may additionally provide self-tests for processing capabilities, interfaces, and memory and may additionally provide front panel error indicators as is known in the art.

The area party line interface may provide for various audio features. The area party line interface supports audio full duplex operation to permit natural two-way conversations. Automatic gain control may be included to equalize audio between various incoming telephone calls to the party line. Furthermore, the ports match the audio capabilities of each calling endpoint, including mixing the audio from participants while supporting 3.1 kHz and/or 7 kHz audio. The interface card may provide DTM-F recognition per the BellCore TR-TSY-000181 standard and may provide echo control through standard suppression and/or cancellation while digital signal processing may eliminate line and background noise as is known in the art.

The area party line interface may provide both entry and exit indications for participants joining or leaving a conference. Pre-recorded system messages may be played for the participants, such as to instruct the participants when there is no available port or when there is no other participant but the user may opt to be called back when a port or other participant becomes available.

Figure 3:
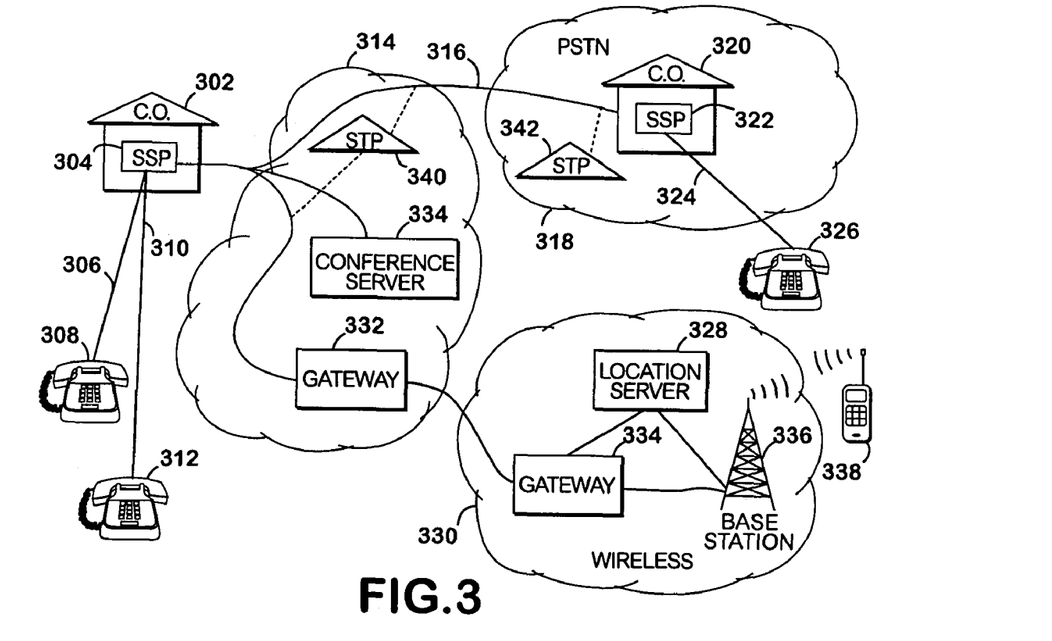
FIG. 3 shows another illustrative encompassing telecommunications network including individual public switched telephone networks, long distance networks, and wireless networks that serves as an operating environment for embodiments of the present invention.

FIG. 3 shows a telecommunications system for embodiments where the area party line service is provided by a centrally located bridging station that provides bridging functionality to establish the area party line service for many central offices rather than having bridging functionality at each SSP. FIG. 3 shows a telecommunications system that includes a public switched telephone network ("PSTN") 314 that includes central offices such as central office 302. Central office 102 includes an SSP 104 that interconnects the PSTN 114 to the individual telephone lines 306 and 310 of local telephone service subscribers. Conventionally, the SSP 304 receives a telephone call and then directs the call through the PSTN 314 to an SSP interconnecting the line dialed by the party to establish a private call between the calling and called parties.

According to the embodiment of FIG. 3, the central call bridging station such as a conference server 344 of the PSTN 314 provides an area party line service. When a caller of telephone 308 places a call over line 306 to the SSP 304, the caller dials a special number as the area party line indicator. For example, the party dials a star code (*##) or a number such as #11. The SSP 304 detects the dialed number indicating the area party line service and then directs the caller over the PSTN 314 to the conference server 344. As described below with reference to FIG. 5, the conference server 344 may provide various options to the caller entering the area party line service, such as providing a call-back option upon others entering the area party line when the caller is the only current participant or upon access to the area party line becoming available.

The area party line service may be established through the central call bridging station such as the conference server 344 for various caller types. For example, a local telephone caller dialing into the service through phone 308 and landline 306 may be placed in an area party line where another local telephone caller dials into the service through phone 312 and landline 310. Both callers dial the party line number that is recognized by the SSP 304 and the callers are both directed over the PSTN 314 under direction of an STP 340 to the conference server 344. The conference server 344 then recognizes that the two incoming callers are directed from the same SSP 304 so they are bridged together within the same area party line. Bridging those calls from the same SSP 304 together provides an inherent geographical relevance to the area party line. Several other local callers may also dial into the service and join the area party line service as well. The capacity of the area party line for a given central call bridging station such as conference server 344 is dictated by the amount of hardware that is devoted to the central call bridging station, as discussed below with reference to FIG. 4.

In addition to the local callers joining the area party line service, additional caller types may also be included. For example, a caller may wish to join an area party line for a distant location. Accordingly, the caller may place a call from telephone 326 over landline 324, which is interconnected to the SSP 322 of the local central office 320 for the caller. In one embodiment, the caller may simply dial into the local area party line service of a central call bridging station (not shown) of the local PSTN 318 and be provided a menu which includes an option to connect to a distant area party line. In that situation, the caller selects the option and then provides the area code and exchange number for the distant area party line. As an alternative, the caller may place a conventional call by dialing an area code and exchange for the distant area party line and then dial a four-digit area party line identifier such as #111.

Once the caller has provided the area code and exchange to the menu based alternative or has completed the dialing of the conventional 10-digit number, the call is transferred based on the area code, exchange, and area party line indicator from the SSP 322 per instruction from a signal transfer point ("STP") 342 of the PSTN 318 that is local to the caller. The call is transferred through the PSTN 318 to a long distance network 316 interconnecting the PSTN 318 of the caller to the PSTN 314 of the area party line that the caller is seeking. As discussed above in relation to FIG. 1, the long distance network 316 is typically interconnected to the PSTN 318 and PSTN 314 via a gateway. The call is then routed through the PSTN 314 per instruction from the STP 340 to the SSP 304 of the local central office 302 corresponding to the area code and exchange entered by the caller. The SSP 304 recognizes the area party line indication, such as the #111, included with the incoming call and then re-directs the call to the conference server 344 under direction of the STP 340. The conference server 344 then bridges the caller into an available port of the area party line bridge.

Another caller type that may join the area party line is a wireless mobile phone caller. The caller places a call to an area party line service through a mobile phone 338 by dialing a special area party line number or star code such as #11 or *##. A base station 336 of a wireless network 330 receives the dialed information from the phone 338 and provides the dialed information to a location server 344. The location server 344 then performs a look-up of the appropriate PSTN exchange that services the locality where the base station 336, and hence caller using phone 338, is located. The wireless call from phone 338 is then directed with the exchange and area party line indicator through a gateway 334 linking the wireless network 330 to a gateway 332 of the PSTN 314.

The wireless call is directed from the gateway 332 through the PSTN 314 to the SSP 304 according to the exchange that has been determined by the location server 344 and that is included with the wireless call. The SSP 304 receives the wireless call and recognizes the area party line indicator. The SSP 304 then re-directs the wireless call under direction of the STP 340 to the conference server 344. The conference server 344 then bridges the wireless call into the area party line.

As discussed above in relation to the embodiment of FIG. 1, the location server 328 may provide the caller with an option to switch to a new area party line when the wireless call is handed off to a new base station due to travel of the caller. As with the embodiment of FIG. 1, the location server 328 detects the new base station and looks up the corresponding new exchange. When the caller wishes to switch to the new area party line, the location server 328 disconnects the caller from the current PSTN connection and then re-establishes a connection to the PSTN 314 utilizing the new exchange. The caller is directed to the new SSP which directs the caller back to the central bridging station which bridges the caller into the new area party line based on the transfer from the new SSP.

The embodiment of FIG. 3 has been described such that for distant and mobile callers, their call is first routed to the local SSP 304 and then re-directed to the conference server 344. However, it will be appreciated that where the gateways to the PSTN 314 are capable of performing switching operations, then incoming calls to the PSTN for a particular exchange may be switched over directly to the central call bridging station from the switching gateways when the area party line indicator of the incoming calls is detected by the switching gateways.

While FIG. 3 describes an embodiment where a PSTN based central call bridging station provides the area party line service by recognizing the area party line indicator and bridging callers together as appropriate, it will be appreciated that the area party line service may be provided from the wireless network 330. For example, a the location server 328 may provide the bridging functionality of a conference server 344 such that wireless calls received at the base station 336 that provide an area party line indicator are re-directed to the conference server of the wireless network 330 where they are bridged together to form the area party line. Accordingly, callers using mobile phone 338 may access an area party line through a central call bridging station of the wireless network without being directed over a PSTN 314.

Figure 4:
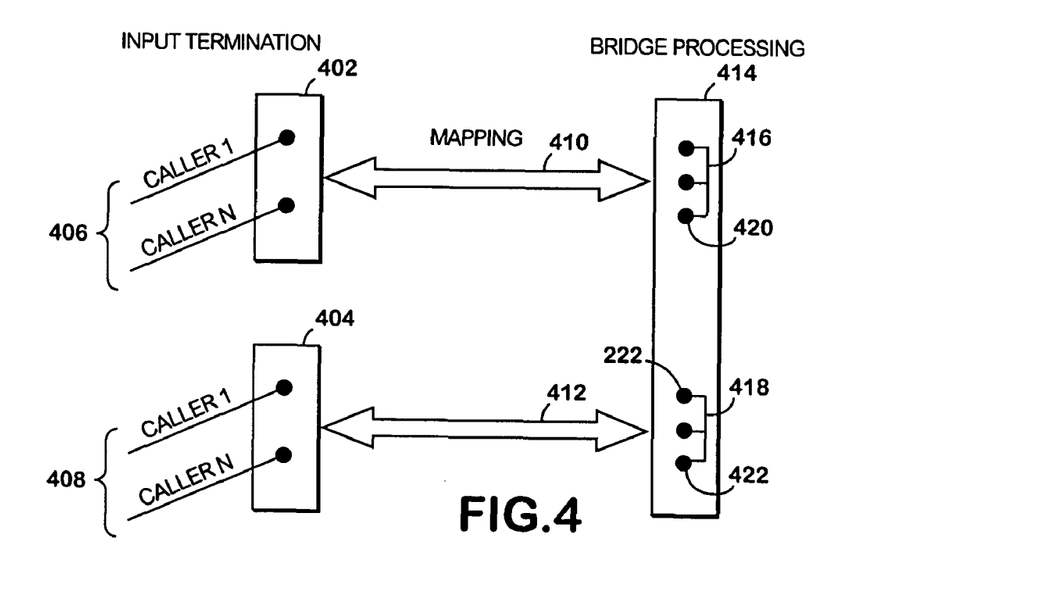
FIG. 4 shows a diagram of a call bridging station that receives calls transferred from local call stations and bridges those calls from a same local call station to provide the area party line.

FIG. 4 describes the components of the central call bridging station such as conference server 344 that provide the area party line service. The central call bridging station contains conventional multiple call termination points 402, 404 that accept multiple telephone lines such as lines 406 from a first SSP and lines 408 from a second SSP. These conventional call termination points 402, 404 may provide call processing such as recognizing the number dialed on an incoming call and determining where the incoming call should be directed based on stored mapping information. The central call bridging station of this embodiment includes mapping 410, 412 that controls the routing of incoming calls of the termination points 402, 404 that have dialed the area party line indicator. These calls with the area party line indicator are mapped to bridge processing 414 that provide multiple ports 420, 422 where sets of ports are bridged together to form a party lines 416, 418.

The bridge processing 414 receives the call from the termination point and assigns the call to an available port 420 for calls from a termination point 406 corresponding to one SSP and assigns the call to an available port 422 for calls from a termination point 408 from another SSP. However, if no port is available due to the bridge processing 414 reaching maximum caller capacity, then the caller may be provided a busy signal or may be provided an option to be dialed in when a port 420, 422 becomes available. Likewise, when a caller is the only caller to have dialed into the area party line service, the bridge processing 414 may provide an option to call back the caller upon a second participant dialing into the area party line service. Upon assigning the incoming calls to a port 420, 422 to bridge the calls together on the party line 416 or 418, each call of the party line 420 or 422 can hear audio from another call of that same party line so that a verbal chat forum is provided.

In addition to providing a party line bridge 420, 422 between all available ports dedicated to calls from a particular SSP, the bridge processing 414 may reconfigure the bridging of the ports as necessary to provide private chat forums. As discussed above in relation to the embodiment of FIG. 1, callers may dial a code or provide other indication when in an area party line to trigger a private forum. The bridge processing 414 may respond to the private forum trigger by reconfiguring the ports of those callers requesting the same private forum so that those ports are bridged separately from other ports that are bridged for the same SSP. Thus, the private forum is provided while the area party line for the SSP continues as well. Upon the private forum participants deciding to exit the private forum such as through dialing an exit code, the port for the exiting participant is then bridged back into the main area party line bridge for that SSP.

It will be appreciated that the central call bridging station of FIG. 4 may employ area party line interface cards as discussed above in relation to FIG. 2. However, the central call bridging station will likely serve multiple SSPs such that the total capacity provided by the area party line interface cards of the central call bridging station is several times greater than that provided by an individual SSP of the embodiment of FIGS. 1 and 2.

Figure 5:
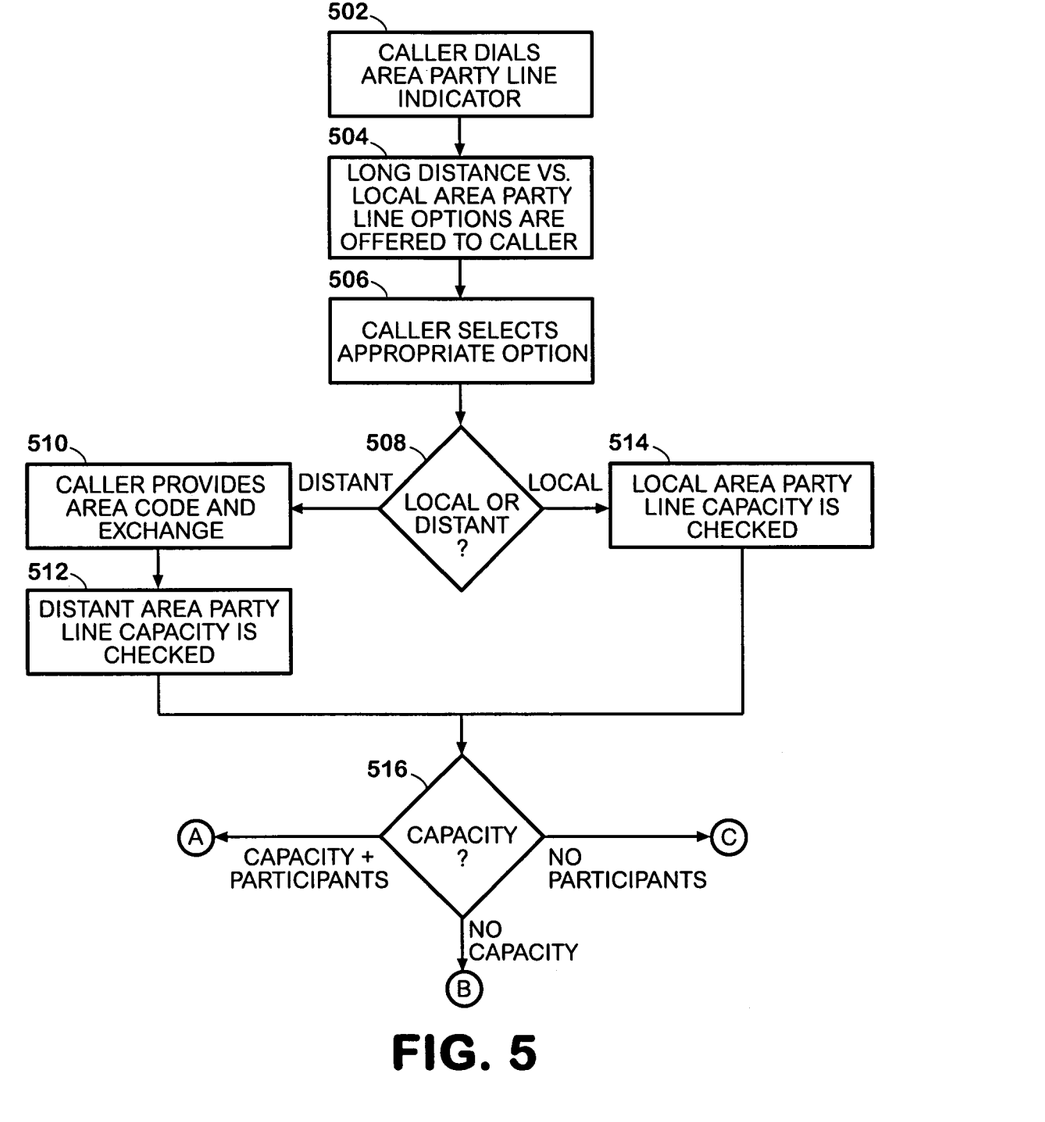
FIGS. 5 and 6 show a set of illustrative logical operations that may be performed within the signal switching point of FIG. 2 or the central call bridging station of FIG. 4 when providing area party line service.
Figure 6:
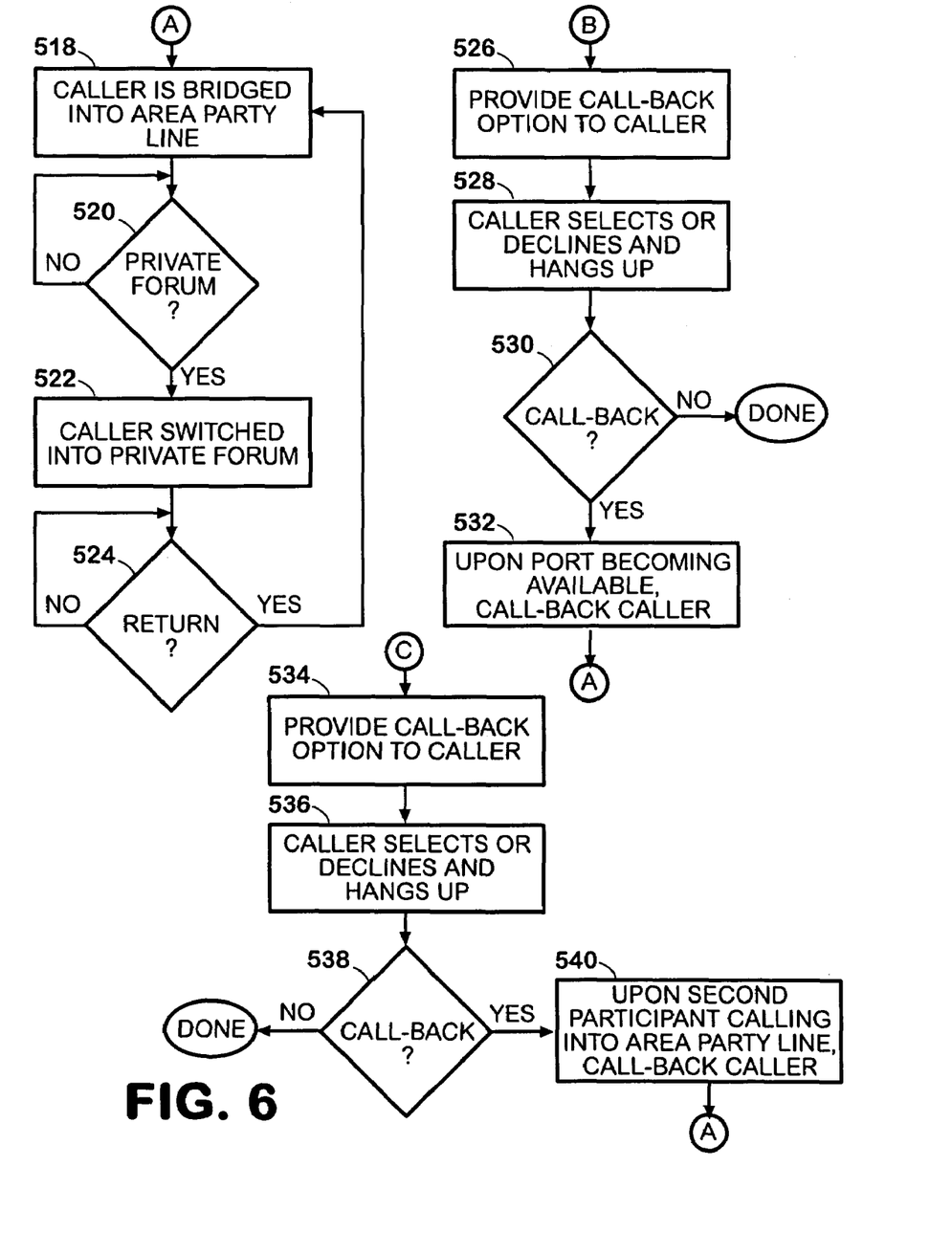

FIGS. 5 and 6 show a set of illustrative logical operations for providing an area party line service through the embodiments discussed above. The logical operations begin at caller operation 502 where the caller dials an area party line indicator through one of the methods discussed above and the call is received at an SSP or central call bridging station providing the area party line service. The area party line service of this embodiment then provides an automated menu for the caller to allow the caller to select a local area party line or a distant area party line at menu operation 504. The caller selects the appropriate option such as through verbal communication or dialing an option number at selection operation 506. The area party line service then detects whether the call has selected the local or distant area party line at query operation 508 so that logical flow either transitions to number operation 510 for the distant option or capacity operation 514 for the local option.

As an alternative to the above set of logical operations, an embodiment may not provide a menu but the caller is instead required to either dial the area party line indicator for a local area party line or for a distant area party line at caller operation 502. For example, the local area party line indicator that is dialed may be a 3-digit code, while the distant area party line indicator that is dialed may be a full 10-digit number including the area code, exchange, and 4-digit area party line indicator. Where the local area party line indicator is dialed, operational flow transitions directly to capacity operation 514, while operational flow transitions directly to capacity operation 512 where the distant area party line indicator is dialed.

For the embodiment where query operation 508 has detected that the caller has opted for a distant area party line, the caller is then prompted to enter the area code and exchange for the distant area party line at number operation 510. Operational flow then transitions to capacity operation 512 for this embodiment.

Once at capacity operation 512, the area party line service for the distant area as identified by the area code and exchange receives the call either at the SSP for the exchange or at a central call bridging station and capacity for the area party line is tested. Operational flow then transitions to query operation 516 where the area party line service detects whether the capacity check resulted in one of three states: capacity plus current participants, no capacity, or capacity but no participants. Similarly, when operational flow has transitioned to capacity operation 514, the local area party line service for the caller tests whether capacity for the area party line is available, and operational flow then transitions to query operation 516 to detect one of the three states discussed above.

When query operation 516 detects that there is capacity and that there are also participants, then the caller is bridged into the area party line service at bridge operation 518. The area party line service then monitors to detect whether the caller or any other participant dials a code to enter a private forum at query operation 520. If and when query operation 520 detects that the caller has selected the private forum by dialing a private forum code, then the area party line service switches the caller into a private forum at switching operation 522. The called may be switched into the private forum as discussed above, such as by reconfiguring the current port of the caller to be bridged into the private forum, or alternatively by switching the caller to a separate port dedicated to a private forum bridge. At query operation 524, the area party line service monitors the private forum to detect whether the caller has dialed an exit code during the private forum, and upon receiving the exit code the caller is bridged back into the area party line at bridging operation 518.

When query operation 516 detects that there is no capacity, then the area party line service provides the caller with the option to be called back to the area party line upon a port becoming available at option operation 526. The caller either selects the option by dialing an option number and then hangs up or declines by hanging up at selection operation 528. The area party line service detects whether the option to be called back has been selected at query operation 530. If the option has not been selected, then the area party line service performs no further operations for this caller. However, when the option has been selected, then the area party line service stores the telephone number of the caller in memory and begins monitoring for capacity. Upon a port becoming available, the area party line then calls back the caller at call-back operation 532 by calling back the number stored in memory.

The area party line service then assigns the call to the available port at bridging operation 518 upon the call being answered.

As an alternative to providing the caller with an option to be called back at option operation 526, the area party line service may instead provide a busy signal back to the caller upon query operation 516 detecting that there is no capacity. In that case, the caller recognizes from the busy signal that the area party line service is not available to the caller at the present, but that the caller may try again later by again dialing into the area party line service.

When query operation 516 detects that there is capacity but that there are no participants, then the area party line service provides the caller with the option to be called back to the area party line upon another participant joining at option operation 534. The caller either selects the option by dialing an option number and then hangs up or declines by hanging up at selection operation 528. The area party line service detects whether the option to be called back has been selected at query operation 538. If the option has not been selected, then the area party line service performs no further operations for this caller. However, when the option has been selected, then the area party line service stores the telephone number of the caller in memory and begins monitoring for another participant who dials in. Upon another participant becoming available, the area party line then calls back the caller at call-back operation 540 by calling back the number stored in memory. The area party line service then assigns the call to an available port at bridging operation 518 upon the call being answered to bridge the caller with the call from the new participant and thereby create a new instance of an area party line.

As an alternative to providing the caller with an option to be called back at option operation 534, the area party line service may instead provide a busy signal back to the caller upon query operation 516 detecting that there is capacity but no participants. In that case, the caller again recognizes from the busy signal that the area party line service is not available to the caller at the present, but that the caller may try again later by again dialing into the area party line service.

As another alternative to providing the caller with an option to be called back at option operation 534, the area party line service may assign the caller to a port and put the caller on-hold until another participant dials in. Then, the new participant is assigned to a port which is bridged with the port of the caller to terminate the on-hold state of the initial caller and thereby create a new instance of an area party line.

For embodiments where the call-back option is provided, then the capacity checks 512, 514 test not only for available ports and ports that are occupied with current participants, but the checks may also determine whether any participants have been queued for call-back. Thus, when a participant has been queued, then query operation 516 detects that there are participants so that operational flow transitions to bridging operation 518 for the current caller and for the previous caller who is being called back by the area party line service.

Additional options may also be provided by the area party line service to callers who have been bridged into an area party line. For example, the SSP or central call bridging station that provides the area party line service may be configured so that several area party lines each with a pre-defined capacity exist. For example, 10 participants per area party line may be a desirable limit to prevent too much confusion within an area party line. However, a caller may be bridged into an area party line and may later decide that this particular area party line is not satisfactory. The area party line service may give the caller an option to switch to another area party line for the same exchange by dialing a particular code. Upon receiving the dialed code, the area party line service then reassigns the caller to a port of a different instance of an area party line for the exchange if the other instance has capacity. Accordingly, the caller may cycle through various instances of an area party line for the exchange until the most satisfactory area party line is found.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of creating area party lines, the method comprising:

receiving a first telephone call at a first local call station directly over a first telecommunication link, the first telephone call providing an area party line indication, wherein the first telephone call providing the area party line indication comprises dialing at least one digit after the first telephone call was received at the first local call station, the area party line indication corresponding to a geographic area associated with at least one call station;

receiving a second telephone call at a second local call station over a second telecommunication link, the second telephone call providing the area party line indication for the first local call station;

transferring the first telephone call from the first local call station to a central call bridging station based on the area party line indication;

transferring the second telephone call from the second local call station to the first local call station, and from the first local call station to the central call bridging station based on the area party line indication;

bridging the second telephone call with the first telephone call at the central call bridging station to establish a first area party line between the first telephone call and the second telephone call based on the transfer of the first telephone call and the second telephone call from the first local call station, wherein the central call bridging station is configured to accommodate further bridging of calls received subsequent to the first telephone call and the second telephone call to the area party line established between the first telephone call and the second telephone call;

receiving a reassignment indication from a caller in the first area party line; and in response to receiving the reassignment indication from the caller in the first area party line, bridging the caller from the first area party line to a second area party line.

2. The method of claim 1, wherein the first telephone call is a landline call, the first local call station is a landline SSP, wherein the second telephone call is a wireless telephone call, the second local call station is a base station, and wherein transferring the wireless telephone call comprises passing the wireless telephone call from the base station through a gateway to the public switched telephone network with an indication of the first local call station, passing the call through the public switched telephone network to the first local call station, and passing the wireless telephone call from the first local call station to the central call bridging station where bridging the second telephone call with the first telephone call occurs based on the transfer from the first local call station.

3. The method of claim 1, wherein the first telephone call is a landline call, the first local call station is a landline SSP, wherein the second telephone call is a landline telephone call, the second local call station is a landline SSP, and wherein transferring the second telephone call to the first local call station comprises transferring the second telephone call over a long distance network.

* * * * *